(12) United States Patent
Zhang et al.

(10) Patent No.: US 11,585,507 B2
(45) Date of Patent: Feb. 21, 2023

(54) LENS FOR AUTOMOBILE LAMP, AUTOMOBILE HEADLAMP, AND AUTOMOBILE

(71) Applicant: HASCO VISION TECHNOLOGY CO., LTD., Shanghai (CN)

(72) Inventors: Jie Zhang, Shanghai (CN); Dehang Shi, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 817 days.

(21) Appl. No.: 16/476,116

(22) PCT Filed: Apr. 25, 2017

(86) PCT No.: PCT/CN2017/081815
§ 371 (c)(1),
(2) Date: Jul. 29, 2019

(87) PCT Pub. No.: WO2018/126564
PCT Pub. Date: Jul. 12, 2018

(65) Prior Publication Data
US 2019/0353319 A1 Nov. 21, 2019

(30) Foreign Application Priority Data

Jan. 6, 2017 (CN) .......................... 201710009639.X
Jan. 6, 2017 (CN) .......................... 201720014167.2

(51) Int. Cl.
*F21S 41/275* (2018.01)
*F21S 41/265* (2018.01)
*F21S 45/10* (2018.01)

(52) U.S. Cl.
CPC .......... *F21S 41/275* (2018.01); *F21S 41/265* (2018.01); *F21S 45/10* (2018.01)

(58) Field of Classification Search
CPC ..................................................... F21S 45/10
See application file for complete search history.

(56) References Cited

U.S. PATENT DOCUMENTS

| | | | |
|---|---|---|---|
| 6,474,839 B1 | 11/2002 | Hutchison | |
| 7,588,358 B1* | 9/2009 | Condon | F21S 43/14 362/520 |
| 2012/0075866 A1* | 3/2012 | Chang | F21V 5/045 362/311.06 |
| 2016/0003437 A1* | 1/2016 | Sakashita | F21S 41/26 362/520 |

* cited by examiner

*Primary Examiner* — Thomas M Sember

(57) ABSTRACT

A lens for an automobile lamp, an automobile headlamp, and an automobile are disclosed. A lens (1) for an automobile lamp includes a first lens surface (11) and a second lens surface (12) opposite to the first lens surface (11). The first lens surface (11) is a curved surface or a planar surface. The second lens surface (12) includes multiple concentric circle-type annular surfaces. By means of multiple annular surfaces (13) disposed on the second lens surface (12) of the lens (1), parallel incident light that forms an angle with a horizontal direction can be separately incident on several small surfaces without affecting horizontal parallel light penetrating the lens and being focused, so that neither light reflected by the lens nor light penetrating the lens can be effectively focused.

7 Claims, 7 Drawing Sheets

LENS FOR AUTOMOBILE LAMP, AUTOMOBILE HEADLAMP, AND AUTOMOBILE

CROSS REFERENCES TO RELATED APPLICATION

This is a Sect. 371 National Stage of PCT International Application No. PCT/CN2017/081815, filed on Apr. 25, 2017, which claims priority of a Chinese Patent Application No. 201710009639X, filed on Jan. 6, 2017, and claims priority of a Chinese Patent Application No. 2017200141672, filed on Jan. 6, 2017, the contents of the applications hereby are incorporated by reference.

BACKGROUND OF THE PRESENT DISCLOSURE

Field of Disclosure

The present disclosure relates to the technical field of automobile lamp, and in particular, to a lens for an automobile lamp, an automobile headlamp using the lens, and an automobile comprising the headlamp.

Description of Related Arts

A projection-type lighting system is commonly used in an automobile lamp. The projection-type lighting system generally includes a light source, a reflector, shading, and a lens. The reflector is ellipsoidal. A light emitting center of the light source is disposed at a near focus of the ellipsoidal reflector. Light emitted by the light source is converged near a far focus of the ellipsoidal reflector after being reflected by the ellipsoidal reflector. The shading is disposed at the far focus of the ellipsoidal reflector, and the shape of the shading matches the shape of a cut-off line required by a low beam. Finally, a low beam lighting shape similar to parallel light with a cut-off line is formed through the lens. The automobile headlamp has the following features: light emitted by the light source is transmitted from an internal lens surface to an external lens surface; the incident light is focused near the focus of the lens and then transmitted to the internal lens surface; the emergent light has substantially in a horizontal direction. Therefore, in the lens for an automobile lamp, only focusing of horizontal parallel light or light substantially in the horizontal direction is considered. However, sunlight is usually incident on the lens from above the lens in an inclined angle, and the angle changes constantly.

SUMMARY OF THE PRESENT DISCLOSURE

The present disclosure provides a lens for an automobile lamp, an automobile headlamp using the lens, and an automobile comprising the headlamp.

A lens for an automobile lamp comprises a first lens surface and a second lens surface opposite to the first lens surface, the first lens surface is a curved surface or a planar surface, and the second lens surface comprises a plurality of concentric circle-type annular surfaces.

Preferably, the annular surfaces are all curved surfaces or conical surfaces.

Preferably, when the first lens surface and the annular surfaces are curved surfaces, a formula of the curved surface is as follows:

$$Z=(c_x x^2 + c_y y^2)/(1+\sqrt{1-(1+k_x)c_x^2 x^2-(1+k_y)c_y^2 y^2})$$

x is radius the first lens surface, y is radius of the annular surface; $c_x=1/R_x$, $c_y=1/R_y$, $R_x$ is curvature radius of the first lens surface, $R_y$ is curvature radius of the annular surface; and $k_x$ is cone coefficient of the first lens surface, $k_y$ is cone coefficient of the annular surface, $-1<k_x<1$, and $-1<k_y<1$.

Preferably, a plurality of concentric circles is carved on the second lens surface, and the plurality of concentric circles divide the second lens surface into the plurality of annular surfaces.

Preferably, the second lens surface comprises a first hemi-surface and a second hemi-surface; the first hemi-surface is connected to the second hemi-surface through a stepped surface; the first hemi-surface is a curved surface; a plurality of concentric circular arcs are carved on the second hemi-surface; the plurality of concentric circular arcs divide the second hemi-surface into the multiple annular surfaces, and the annular surfaces are arc-shaped.

Preferably, a columnar pattern is carved on the stepped surface.

Preferably, all the annular surfaces are distributed in a stepped manner, and a thickness of the lens (1) gradually decreases or increases from a center to an outer circumference.

Preferably, all the annular surfaces are distributed in the same plane.

An automobile headlamp comprises a light source, a reflector, a shading, and a lens, the lens is the aforementioned lens for an automobile lamp.

An automobile comprises the aforementioned automobile headlamp.

Compared with the prior art, the present disclosure achieves an obvious progress: In the lens for an automobile lamp according to the present disclosure, by means of a plurality of annular surfaces disposed on the second lens surface of the lens, under the premise that horizontal parallel light being focused after penetrating the lens 1 is not affected, parallel incident light that forms an angle with a horizontal direction can be separately incident on several small surfaces, so that neither light reflected by the lens nor light penetrating the lens can be effectively focused. The automobile headlamp according to the present disclosure can eliminate external focusing formed by sunlight reflected by the lens when the sunlight is incident on the automobile headlamp and internal focusing formed by sunlight penetrating the lens, and avoid harm caused by sunlight irradiation to components located on an inner side and outer side of the lens in the automobile headlamp.

Figure 1:
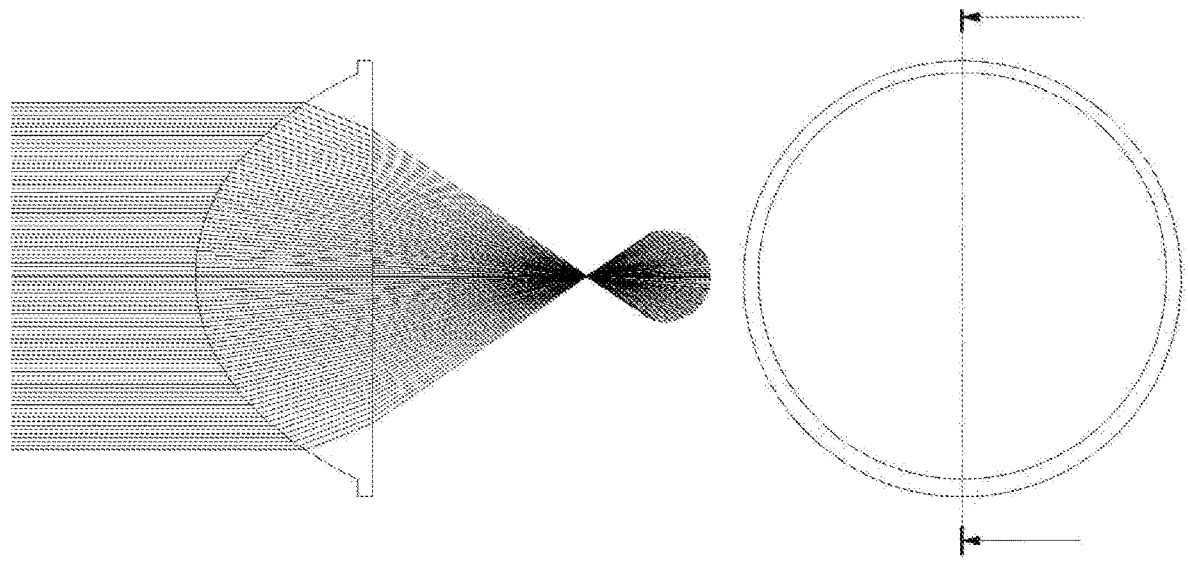
FIG. 1 is a schematic diagram of focusing simulation of horizontal parallel light incident on an external lens surface of a plano-convex lens.

| List of reference numerals | | |
|---|---|---|
| L1: Reflected light | L2: Reflected light | L3: Sunlight |
| 4: Biconvex lens | 6: Plano-convex lens | A, B: Focal point |
| 1: Lens | 11: First lens surface | 12: Second lens surface |
| 121: First hemi-surface | 122: Second hemi-surface | 123: Stepped surface |
| 13: Annular surface | 13': Annular surface | 14: Concentric circles |
| 14': Concentric circular arcs | 15: Columnar pattern | 16: Light source |
| 17: Reflector | 18: Shading | |

DETAILED DESCRIPTION OF THE PREFERRED EMBODIMENTS

Specific implementations of the present disclosure are further described in detail below with reference to the accompanying drawings. These implementations are merely used for illustrating the present disclosure, and are not intended to limit the present disclosure.

In the description of the present disclosure, it should be noted that, orientations or positional relations indicated by terms such as "center," "longitudinal," "lateral," "upper," "lower," "front," "rear," "left," "right," "vertical," "horizontal," "top," "bottom," "internal" and "external" are based on orientations or positional relations shown in the drawings, and are merely used for describing the present disclosure and simplifying the description, but do not indicate or imply that the stated apparatus or element should have the specific orientation or constructed or operated at the specific orientation. Therefore, such terms should not be construed as limitations on the present disclosure. In addition, terms "first" and "second" are merely used for description, and should not be interpreted as indicating or implying relative importance.

In the description of the present disclosure, it should be noted that, terms "mount," "interconnect" and "connect" should be interpreted in a broad sense, unless otherwise specified or limited clearly. For example, a connection may be a fixed connection, a detachable connection, or an integrated connection, may be a mechanical connection or an electrical connection, may be a direct connection, an indirect connection through an intermediate medium, or communication between interiors of two elements. For a person of ordinary skill in the art, the specific meaning of the foregoing terms in the present disclosure may be interpreted according to a specific situation.

In addition, in the description of the present disclosure, "multiple" means two or more, unless otherwise specified.

As shown in FIG. 1, a conventional lens employs a plano-convex lens. An internal lens surface of the plano-convex lens is a planar surface, and is disposed towards the light source. An external lens surface of the plano-convex lens is an aspheric surface. Light from the light source is focused near a focus of the plano-convex lens and then transmitted from the internal lens surface to the external lens surface of the plano-convex lens. Emergent light is substantially in a horizontal direction. A material of the conventional plano-convex lens is transparent plastic or glass, for example, Polycarbonate (PC) or Polymethyl Methacrylate (PMMA). According to the size of the diameter and the focal length of the plano-convex lens, a maximum thickness thereof ranges from 20 mm to 50 mm. An advantage of such a lens lies in that, through the design of an aspheric convex lens, the aberration in spherical convex lens imaging is corrected, so that lens imaging is clearer and not distorted. However, such a lens also has the following problem: sunlight is incident on the lens in the daytime; the sunlight is focused in the front of the lens after being reflected by the lens, and converged at the rear of the lens after being refracted by the lens, thus burning out components in the lamp. Moreover, as an incident angle of the sunlight changes, the focusing position changes dynamically within a certain range.

Figure 2:
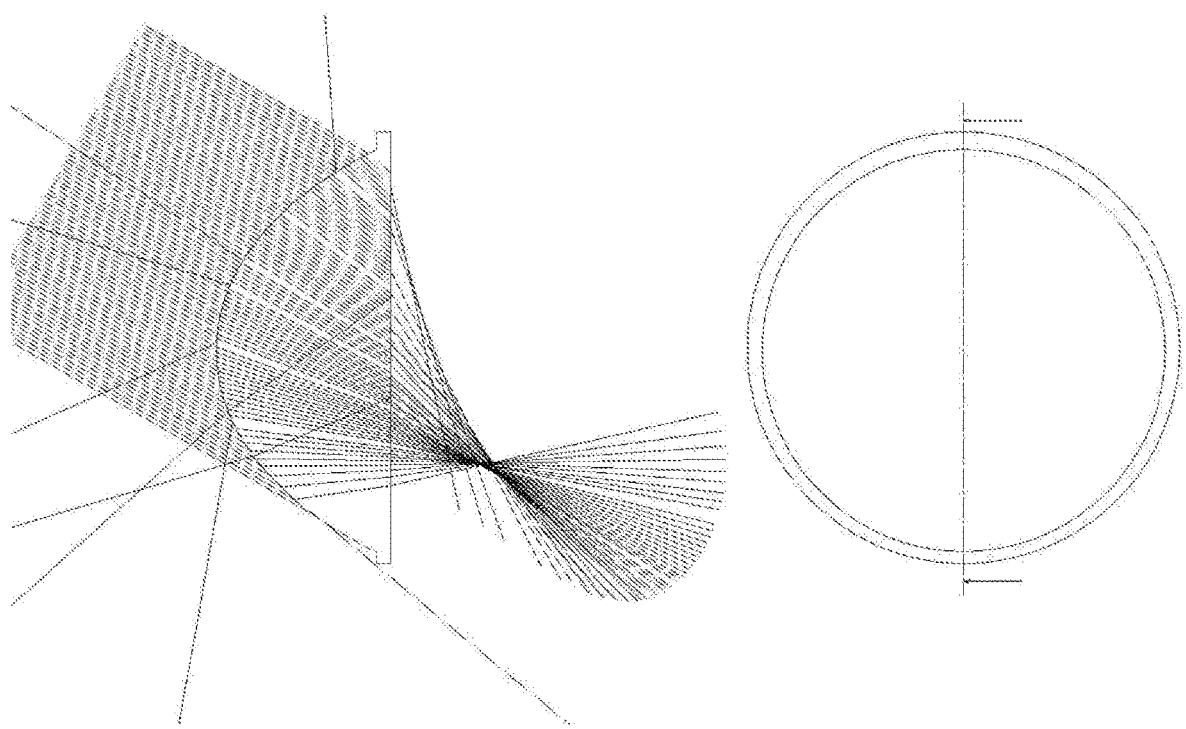
FIG. 2 is a schematic diagram of focusing simulation of parallel light, which forms an angle of 30° with a horizontal direction, incident on an external lens surface of a plano-convex lens.
Figure 3:
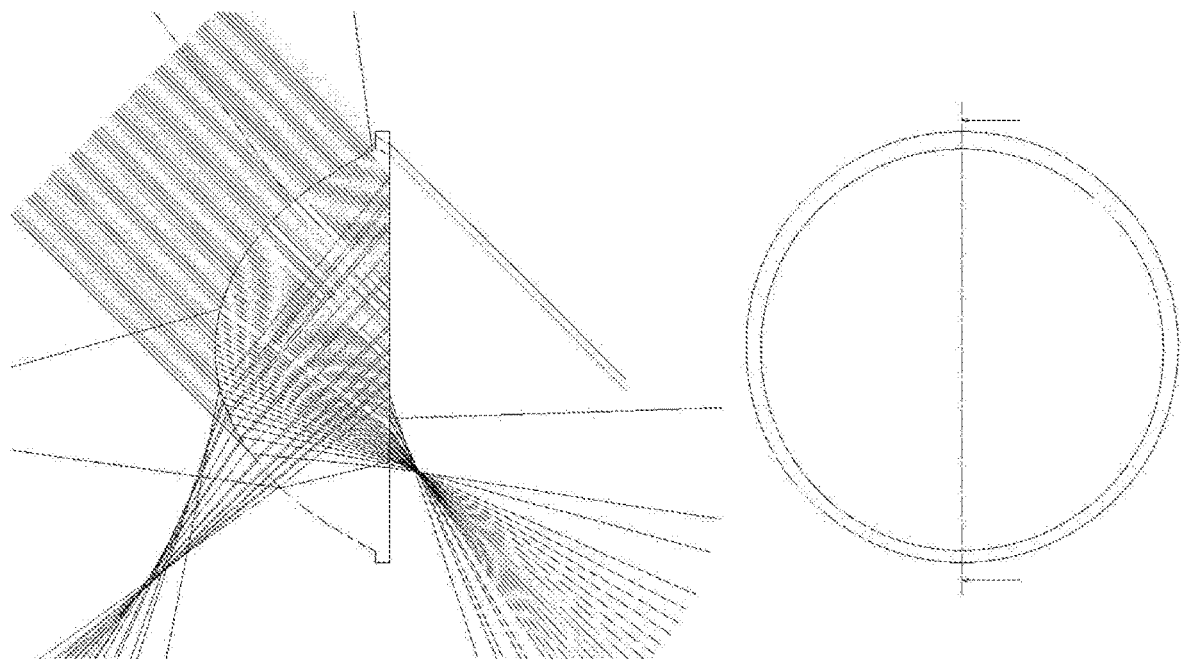
FIG. 3 is a schematic diagram of focusing simulation of parallel light, which forms an angle of 45° with a horizontal direction, incident on an external lens surface of a plano-convex lens.
Figure 4:
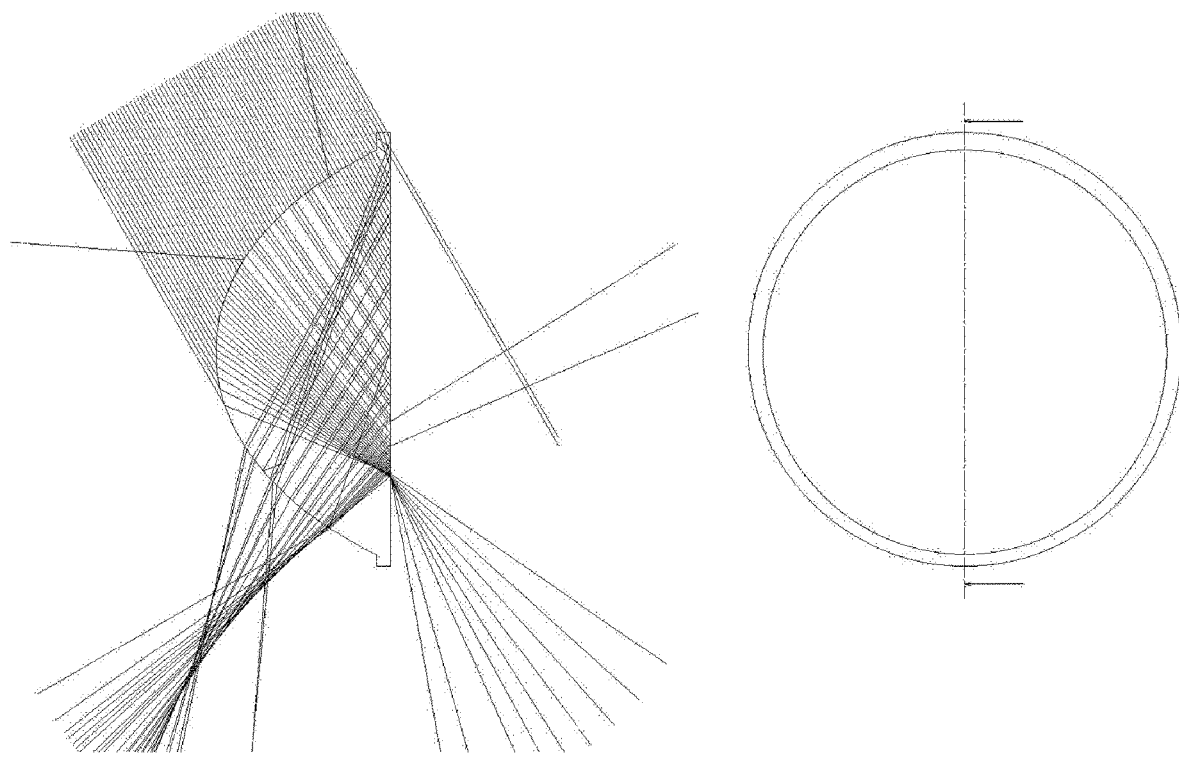
FIG. 4 is a schematic diagram of focusing simulation of parallel light, which forms an angle of 60° with a horizontal direction, incident on an external lens surface of a plano-convex lens.

FIG. 2, FIG. 3, and FIG. 4 show focusing simulation of parallel light, which forms an angle of 30°, 45° and 60° with a horizontal direction respectively, incident on an external lens surface of a plano-convex lens. FIG. 2 shows that parallel light, which forms an angle of 30° with the horizontal direction, forms internal focusing on a side of an internal lens surface of the plano-convex lens after passing through the plano-convex lens. FIG. 3 shows that parallel light, which forms an angle of 45° with the horizontal direction, forms internal focusing on a side of an internal lens surface of the plano-convex lens after passing through the plano-convex lens, and light reflected by the internal lens surface forms external focusing on a side of an external lens surface of the plano-convex lens. FIG. 4 shows that when parallel light, which forms an angle of 60° with the horizontal direction, passes through the plano-convex lens, an incident angle of most light is greater than an angle of total reflection when the light is incident on an internal lens surface, thus forming total reflection, and external focusing with strong light energy is formed on a side of an external lens surface of the plano-convex lens.

Figure 5:
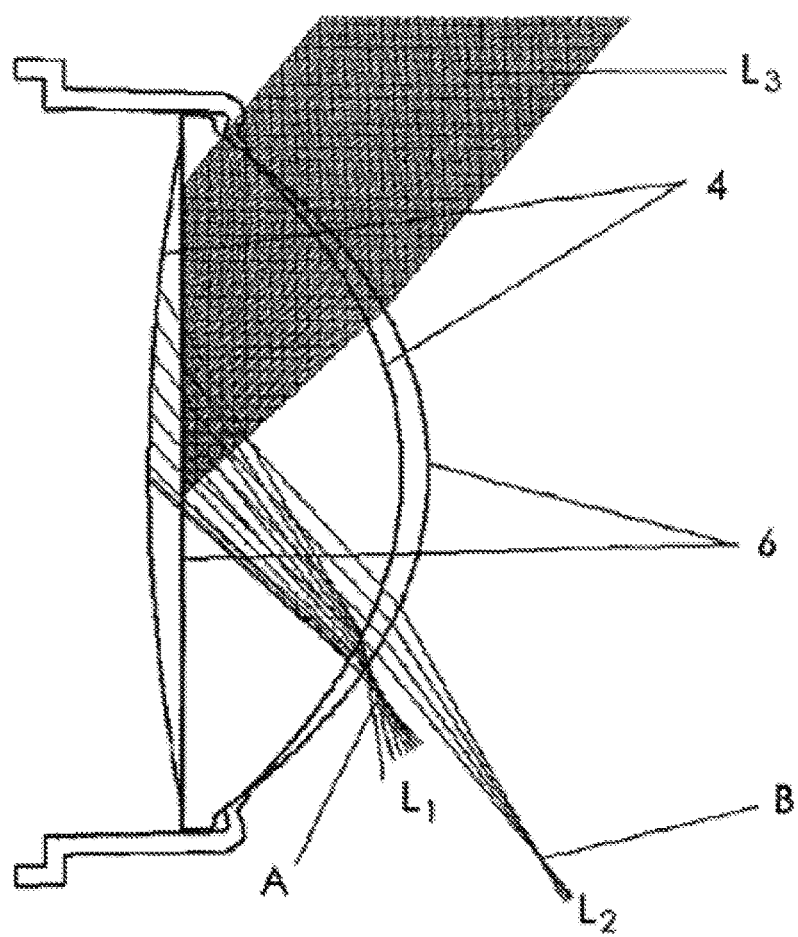
FIG. 5 is a comparison diagram of sunlight focusing between a biconvex lens and a plano-convex lens in the prior art.

The patent, with the Publication No. CN101298906A, discloses an automobile headlamp based on a biconvex lens. A design solution of a biconvex lens with a spherical internal lens surface and a free-form external lens surface is used, thereby reducing the reflection focal length, and reducing the risk that sunlight is focused after being reflected by the lens and burns out the automobile lamp or other components on the automobile. As shown in FIG. 5, sunlight L3 is incident parallel at a certain angle, and after being reflected by a biconvex lens 4, reflected light L1 is focused near A. After being reflected by a plano-convex lens 6, reflected light L2 is focused near B. It can be seen that, a focal point position after reflection by the biconvex lens is smaller than a focal point position after reflection by the plano-convex lens. However, this design has the following disadvantages:

(1) The biconvex lens can only reduce a focal length after reflection of sunlight and the risk that the sunlight is focused after being reflected by the lens and burns out the automobile lamp or other components on the vehicle, but cannot completely eliminate the problem of focusing after reflection.

(2) The biconvex lens cannot resolve that sunlight is focused on a side of an internal lens surface after passing through the lens and burns out components on an internal side of the lens.

(3) Due to the principle of an optical path thereof, the biconvex lens is still thick and uses many materials, resulting in defects such as high costs and heavy mass, which are adverse to shock resistance performance during driving. Moreover, light has a long optical path in the lens. As a result, much light energy is absorbed by the lens when the light is propagated inside the lens, thus lowering luminous efficiency of a projection-type lighting system.

FIGS. 6 to 12 show an embodiment of a lens for an automobile lamp according to the present disclosure. A lens 1 according to this embodiment includes a first lens surface 11 and a second lens surface 12 opposite to the first lens surface 11. The first lens surface 11 may be a curved surface, and the curved surface may be a spherical surface or an aspheric surface. Alternatively, the first lens surface 11 may be a planar surface. The second lens surface 12 includes a plurality of annular surfaces 13 of concentric circles-type. The annular surfaces 13 may be disposed all over the second lens surface 12, that is, all the annular surfaces 13 are revolution surfaces. Alternatively, the annular surfaces 13 may be disposed in part areas of the second lens surface 12, that is, all the annular surfaces 13 are arc-shaped annular surfaces. The rest of the areas of the second lens surface 12 are curved surfaces. The curved surface may be a spherical surface or an aspheric surface. The annular surfaces 13 may be curved surfaces, the curved surface may be a spherical surface or an aspheric surface. Alternatively, all the annular surfaces 13 may be conical surfaces. The annular surfaces 13 may be distributed in the same plane or may be distributed in a stepped manner. The thickness of the lens 1 gradually decreases or increases from a center to an outer circumference, that is, the second lens surface 12 is convex outward or concave inward.

Figure 6:
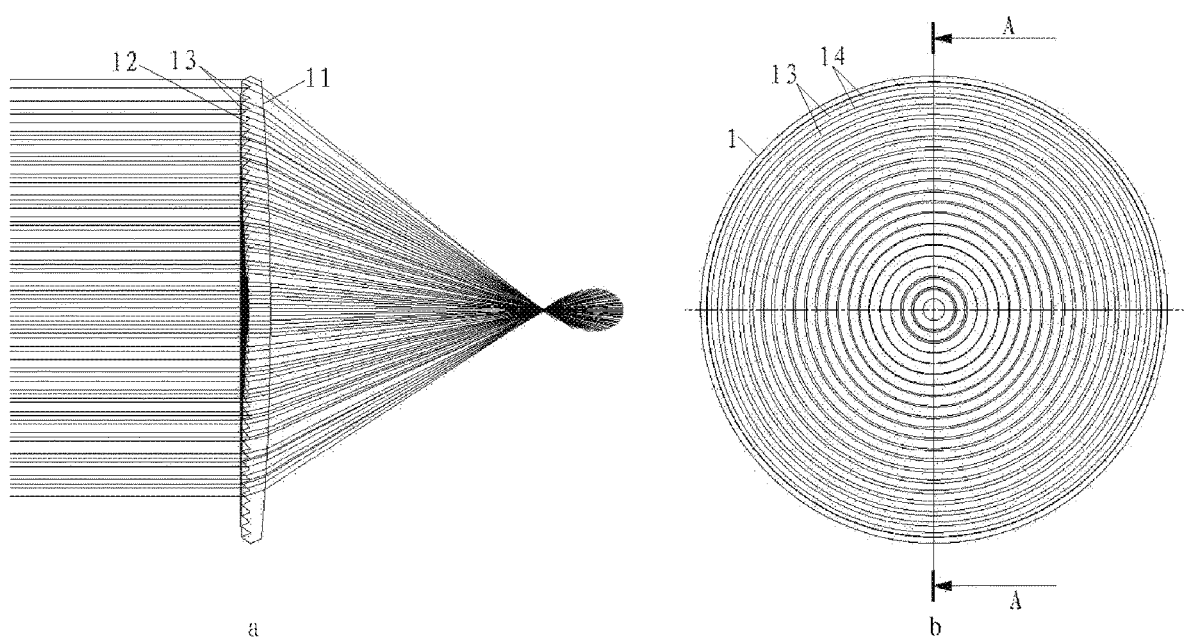
FIG. 6 is a schematic diagram of a structure and optical performance of a first lens provided in an embodiment of the present disclosure.

FIG. 6 shows the lens 1 according to this embodiment. FIG. 6a is a cross-sectional schematic diagram taken along A-A in FIG. 6b and a schematic diagram of optical performance of the lens 1. In FIG. 6, the first lens surface 11 of the lens 1 is a curved surface, and a plurality of concentric circles 14 are carved all over the second lens surface 12. The concentric circles 14 are concentric with the second lens surface 12. The concentric circles 14 divide the second lens surface 12 into a plurality of annular surfaces 13. All the annular surfaces 13 are distributed in the same plane. Horizontal parallel light can be focused after penetrating the lens 1.

Figure 7:
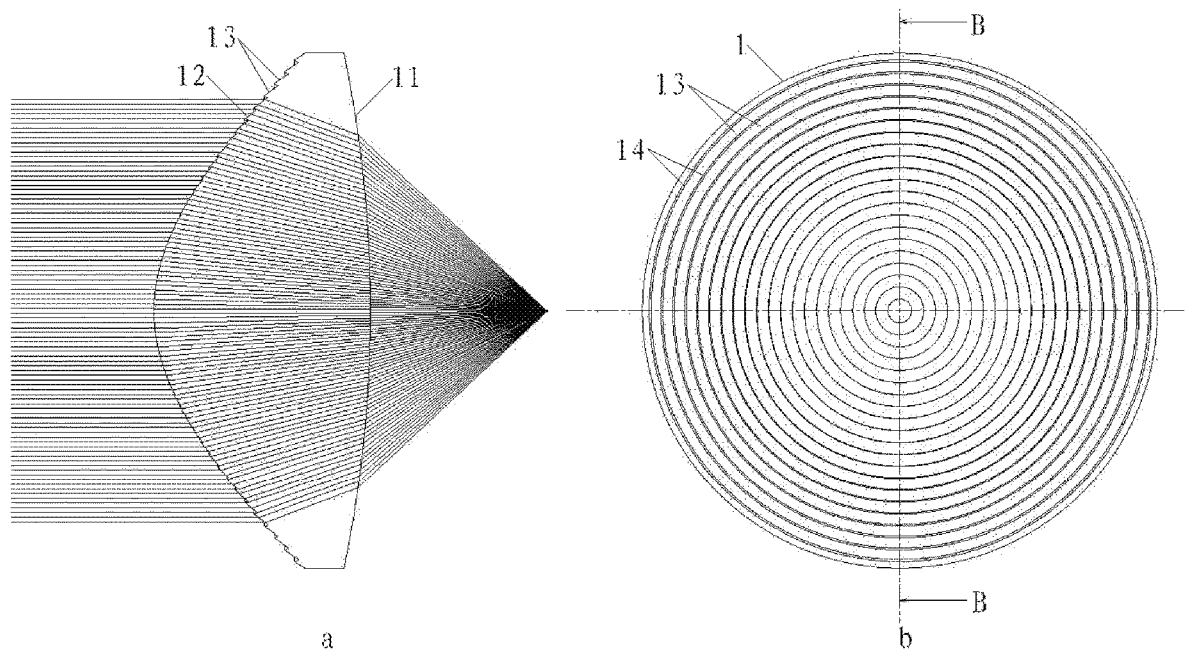
FIG. 7 is a schematic diagram of a structure and optical performance of a second lens provided in an embodiment of the present disclosure.

FIG. 7 shows a second form of the lens 1 according to this embodiment. FIG. 7a is a cross-sectional diagram taken along B-B in FIG. 7b and a schematic diagram of optical performance of the lens 1. In FIG. 7, the first lens surface 11 of the lens 1 is a curved surface, and a plurality of concentric circles 14 are carved all over the second lens surface 12. The plurality of concentric circles 14 is concentric with the second lens surface 12. The plurality of concentric circles 14 divide the second lens surface 12 into a plurality of annular surfaces 13. The annular surfaces 13 are distributed in a stepped manner, and the thickness of the lens 1 gradually decreases from a center to an outer circumference. Horizontal parallel light can be focused after penetrating the lens 1.

Figure 8:
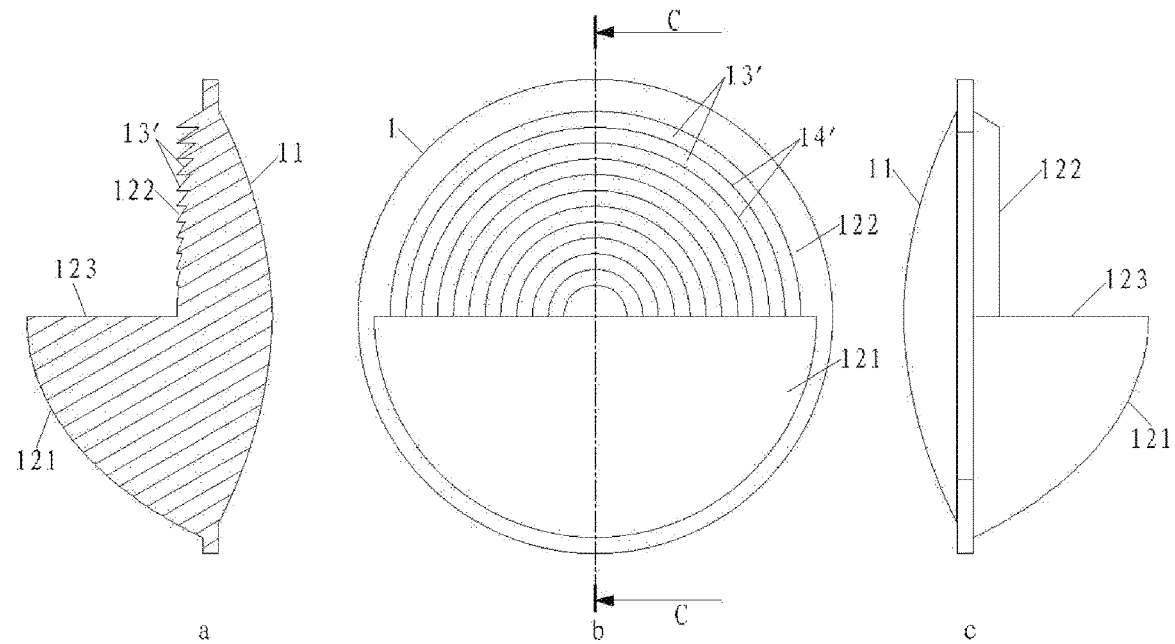
FIG. 8 is a schematic diagram of a third lens provided in an embodiment of the present disclosure.

FIG. 8 shows a third form of the lens 1 according to this embodiment. FIG. 8b is a front view of the lens 1. FIG. 8a is a cross-sectional diagram taken along C-C in FIG. 8b. FIG. 8c is a side view of the lens 1. In FIG. 8, the first lens surface 11 of the lens 1 is a curved surface; the second lens surface 12 includes a first hemi-surface 121 and a second hemi-surface 122. The first hemi-surface 121 is connected to the second hemi-surface 122 through a stepped surface 123. The stepped surface 123 is parallel to the axis of the lens 1. Centers of the first hemi-surface 121 and the second hemi-surface 122 both are located on the axis of the lens 1. The first hemi-surface 121 is a curved surface, and a plurality of concentric circular arcs 14' are carved on the second hemi-surface 122. The concentric circular arcs 14' divide the second hemi-surface 122 into a plurality of annular surfaces 13', the annular surfaces 13' are arc-shaped. Horizontal parallel light can be focused after penetrating the lens 1.

Figure 9:
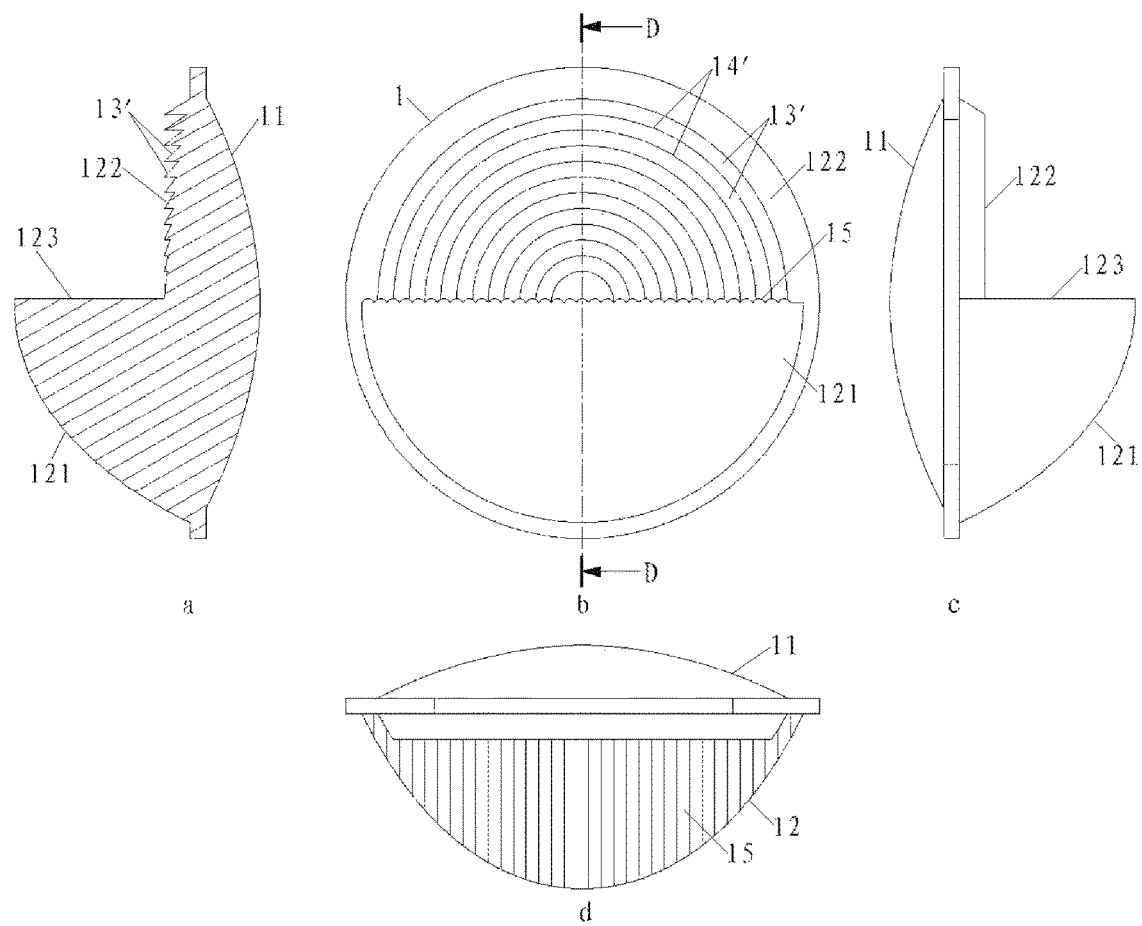
FIG. 9 is a schematic diagram of a fourth lens provided in an embodiment of the present disclosure.

FIG. 9 shows a fourth form of the lens 1 according to this embodiment. FIG. 9b is a front view of the lens 1. FIG. 9a is a cross-sectional diagram taken along D-D in FIG. 9b. FIG. 9c is a side view of the lens 1. FIG. 9d is a top view of the lens 1. The lens 1 shown in FIG. 9 is basically the same as the lens 1 shown in FIG. 8, and the same parts are not described in detail again. The difference is that, in the lens 1 in FIG. 9, columnar pattern 15 is carved on a stepped surface 123 between the first hemi-surface 121 and the second hemi-surface 122. The columnar pattern 15 destroys optical performance of the stepped surface 123, so that light incident on the stepped surface 123 cannot be focused effectively. Horizontal parallel light can be focused after penetrating the lens 1.

The lens according to the present disclosure is not limited to the four forms in FIG. 6 to FIG. 9 in this embodiment.

In the four forms of lenses 1 shown in FIG. 6 to FIG. 9, the first lens surface 11 as well as the annular surfaces 13, the annular surfaces 13' and the first hemi-surface 121 in the second lens surface 12 are curved surfaces, and a formula of the curved surface is as follows:

$$Z=(c_x x^2 + c_y y^2)/(1+\sqrt{1-(1+k_x)c_x^2 x^2 - (1+k_y)c_y^2 y^2})$$

x is radius the first lens surface 11, y is radius of the annular surface 13 (or the annular surfaces 13', or the first hemi-surface 121); $c_x=1/R_x$, $c_y=1/R_y$, $R_x$ is curvature radius of the first lens surface 11, $R_y$ is curvature radius of the annular surface 13 ((or the annular surfaces 13', or the first hemi-surface 121)); and $k_x$ is cone coefficient of the first lens surface 11, $k_y$ is cone coefficient of the annular surface 13 ((or the annular surfaces 13', or the first hemi-surface 121)), $-1<k_x<1$, and $-1<k_y<1$.

When $k_x=0$ and $k_y=0$, the first lens surface 11 and the annular surfaces 13 (or the annular surfaces 13', or the first hemi-surface 121) are spherical surfaces. When $k_x=0$ and $k_y\neq 0$, the first lens surface 11 is a spherical surface, and the annular surfaces 13 (or the annular surfaces 13' or the first hemi-surface 121) are aspheric surfaces. When $k_x\neq 0$ and $k_y=0$, the first lens surface 11 is an aspheric surface, and the annular surfaces 13 (or the annular surfaces 13' or the first hemi-surface 121) are spherical surfaces.

Figure 10:
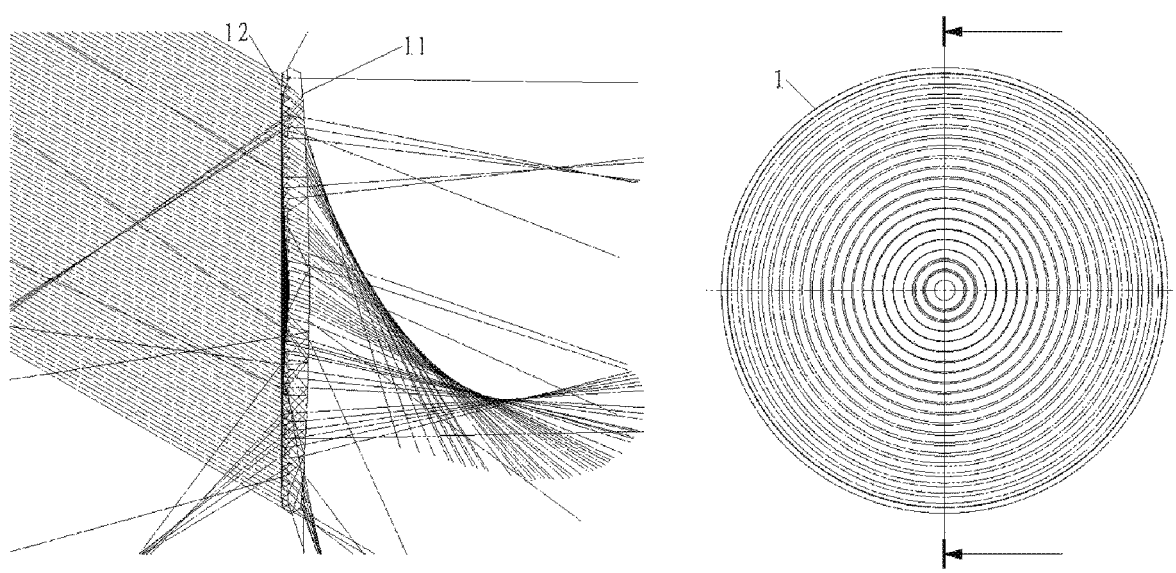
FIG. 10 is a schematic diagram of focusing simulation of parallel light, which forms an angle of 30° with a horizontal direction, incident on a second lens surface of the lens shown in FIG. 6.
Figure 11:
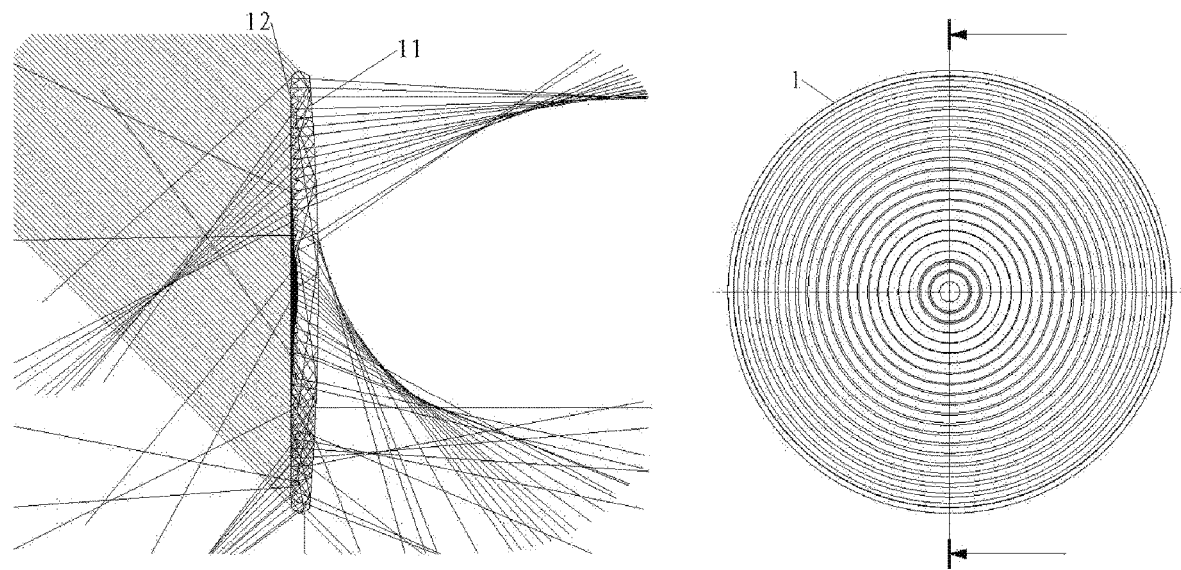
FIG. 11 is a schematic diagram of focusing simulation of parallel light, which forms an angle of 45° with a horizontal direction, incident on a second lens surface of the lens shown in FIG. 6.
Figure 12:
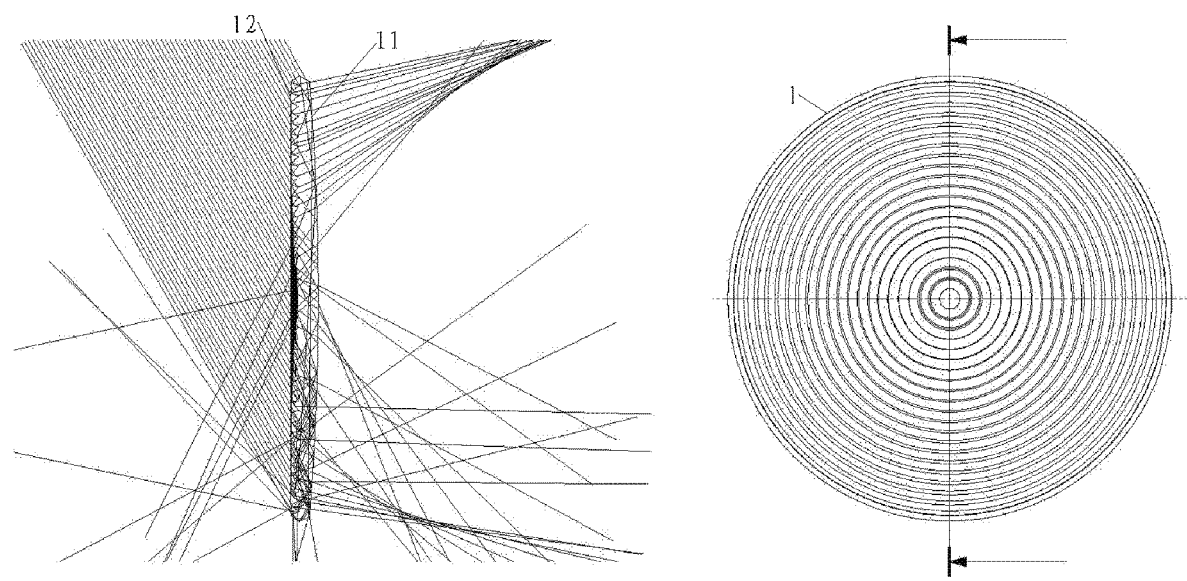
FIG. 12 is a schematic diagram of focusing simulation of parallel light, which forms an angle of 60° with a horizontal direction, incident on a second lens surface of the lens shown in FIG. 6.

FIG. 10, FIG. 11, and FIG. 12 show focusing simulation of parallel light, which forms an angle of 30°, 45° and 60° with a horizontal direction, incident on the second lens surface 12 of the lens 1 shown in FIG. 6. It can be seen clearly from the simulation results that, in the lens 1 according to this embodiment, by means of the plurality of annular surfaces 13 disposed on the second lens surface 12, under the premise that horizontal parallel light being focused after penetrating the lens 1 is not affected (as shown in FIG. 6), parallel incident light that forms an angle with the horizontal direction can be separately incident on several small surfaces, so that neither light reflected by the lens 1 nor light penetrating the lens 1 can be effectively focused. According to an optical principle, when parallel light that forms an angle with the horizontal direction is incident on the first lens surface 11 of the lens 1, the same effect can be achieved. Similar to the optical performance of the lens 1 shown in FIG. 6, lenses 1 of other forms according to this embodiment can achieve the effect of eliminating focusing of light, which is incident at an angle with respect to the horizontal direction, after the light is reflected by the lens 1 and focusing of light after the light penetrates the lens 1.

In addition, due to an optical principle thereof, the lens 1 according to this embodiment can have a smaller design thickness compared with the conventional plano-convex lens and the existing biconvex lens. A minimum thickness of the lens 1 according to this embodiment can be 1 mm. Therefore, fewer materials may be used, and costs can be reduced. Moreover, in practical application, an optical length of light in the lens 1 can be reduced, thereby reducing a light energy loss of light during propagation in the lens 1, and improving luminous efficiency.

The lens 1 according to this embodiment may be made of transparent glass formed by means of glass firing and rolling, or may be made of transparent plastic, formed by means of plastic injection molding.

Figure 13:
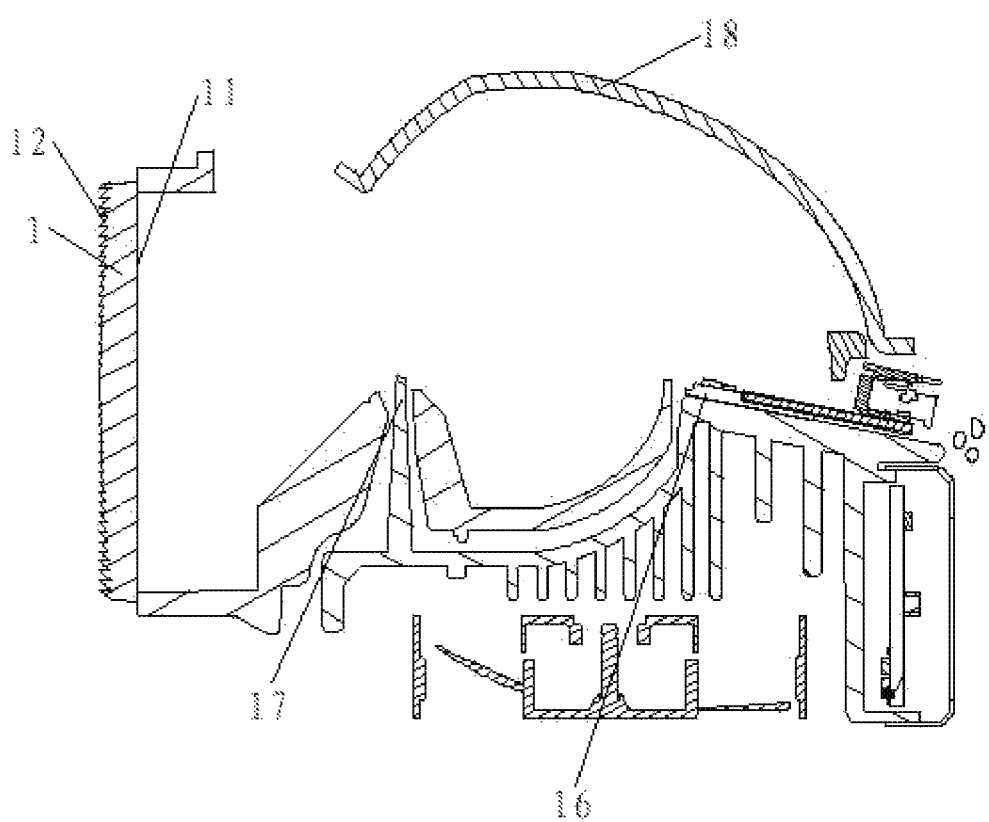
FIG. 13 is a schematic structural diagram of an automobile headlamp according to an embodiment of the present disclosure.

Based on the foregoing lens, this embodiment further provides an automobile headlamp. As shown in FIG. 13, the automobile headlamp according to this embodiment includes a light source 16, a reflector 17, a shading 18, and a lens 1. A light emitting center of the light source 16 is disposed at a near focus of the reflector 17, and light emitted by the light source 16 is converged near a far focus of the reflector 17 after being reflected by the reflector 17. The shading 18 is disposed at the far focus of the reflector 17, and the shape of the shading 18 is consistent with the shape of a cut-off line required by a low beam. Light emitted by the light source 16 is focused near the focus of the lens 1 and is then propagated to the lens 1. Finally, a low beam lighting shape similar to parallel light with a cut-off line is formed through the lens 1.

The first lens surface 11 of the lens 1 shown in FIG. 13 is designed to be a planar surface, and is used as an internal surface facing towards the light source 16. The second lens surface 12 of the lens 1 is the second lens surface 12 shown in FIG. 6, and is used as an external surface away from the light source. Or, the lens 1 may be any of the lenses 1 described above. Alternatively, it is also possible to use the first lens surface 11 of the lens 1 as an external surface and the second lens surface 12 as an internal surface. This can also achieve an objective of preventing effective focusing of sunlight incident on the headlamp after the sunlight is reflected by the lens 1 and penetrates the lens 1, thereby avoiding harm caused by sunlight irradiation to components located on an inner side and outer side of the lens 1 in the automobile headlamp. When the lens 1 shown in FIG. 8 and FIG. 9 is used, the first hemi-surface 121 is disposed at a lower position, and the second hemi-surface 122 is disposed at an upper position, so that sunlight irradiation can be better eliminated without affecting a lighting function of the headlamp. In addition, because the lens 1 according to this embodiment has a small thickness and light mass, shock resistance performance during driving of the automobile can be improved. Moreover, an optical path of light emitted by the light source 16 in the lens 1 can be reduced, thereby reducing light energy loss of light during propagation in the lens 1, and improving luminous efficiency of an automobile headlamp lighting efficiency.

Based on the foregoing automobile headlamp, this embodiment further provides an automobile. The automobile according to this embodiment includes the foregoing automobile headlamp.

In conclusion, in the lens for an automobile lamp according to this embodiment, by means of the plurality of annular surfaces 13 disposed on the second lens surface 12 of the lens 1, under the premise that horizontal parallel light being focused after penetrating the lens 1 is not affected, parallel incident light that forms an angle with a horizontal direction can be separately incident on several small surfaces, so that neither light reflected by the lens 1 nor light penetrating the lens 1 can be effectively focused. The automobile headlamp according to this embodiment can eliminate external focusing formed by sunlight reflected by the lens 1 when the sunlight is incident on the automobile headlamp and internal focusing formed by sunlight penetrating the lens 1, and avoid harm caused by sunlight irradiation to components located on an inner side and outer side of the lens 1 in the automobile headlamp.

The above description is merely preferred embodiments of the present disclosure. It should be noted that, for a person of ordinary skill in the art, several improvements and replacements can be made without departing from the technical principle of the present disclosure. These improvements and replacements should also be considered as falling within the protection scope of the present disclosure.

What is claimed is:

1. A lens (1) for an automobile lamp, comprising a first lens surface (11) and a second lens surface (12) opposite to the first lens surface (11), wherein the first lens surface (11) is a curved surface or a planar surface, and the second lens surface (12) comprises a plurality of concentric circle-type annular surfaces (13); wherein all the annular surfaces (13) are distributed in a stepped manner, and a thickness of the lens (1) gradually increases from a center to an outer circumference, and the second surface (12) is concave inward; wherein the second lens surface (12) comprises a first hemi-surface (121) and a second hemi-surface (122); the first hemi-surface (121) is connected to the second hemi-surface (122) through a stepped surface (123); the first hemi-surface (121) is a curved surface; a plurality of concentric circular arcs (14') are carved on the second hemi-surface (122); the plurality of concentric circular arcs (14') divide the second hemi-surface (122) into the multiple annular surfaces (13'), and the annular surfaces (13') are arc-shaped.

2. The lens for an automobile lamp as in claim 1, wherein the annular surfaces (13) are curved surfaces or conical surfaces.

3. The lens for an automobile lamp as in claim 2, wherein when the first lens surface (11) and the annular surfaces (13) are curved surfaces, a formula of the curved surface is as follows:

$$Z=(c_x x^2+c_y y^2)/(1+\sqrt{1-(1+k_x)c_x^2 x^2-(1+k_y)c_y^2 y^2}),$$

x is radius the first lens surface (11), y is radius of the annular surface (13);

$c_x=1/R_x$, $c_y=1/R_y$, $R_x$ is curvature radius of the first lens surface (11), $R_y$ is curvature radius of the annular surface (13); and $k_x$ is cone coefficient of the first lens surface (11), $k_y$ is cone coefficient of the annular surface (13), $-1<k_x<1$, and $-1<k_y<1$.

4. The lens for an automobile lamp as in claim 1, wherein a plurality of concentric circles (14) are carved on the second lens surface (12), and the plurality of concentric circles (14) divide the second lens surface (12) into the plurality of annular surfaces (13).

5. The lens for an automobile lamp as in claim 1, wherein a columnar pattern (15) is carved on the stepped surface (123).

6. An automobile headlamp, comprising a light source (16), a reflector (17), a shading (18), and a lens (1), wherein the lens (1) comprises a first lens surface (11) and a second lens surface (12) opposite to the first lens surface (11), the first lens surface (11) is a curved surface or a planar surface, and the second lens surface (12) comprises a plurality of concentric circle-type annular surfaces (13); wherein all the annular surfaces (13) are distributed in a stepped manner, and a thickness of the lens (1) gradually increases from a center to an outer circumference, and the second surface (12) is concave inward; wherein the second lens surface (12) comprises a first hemi-surface (121) and a second hemi-surface (122); the first hemi-surface (121) is connected to the second hemi-surface (122) through a stepped surface (123); the first hemi-surface (121) is a curved surface; a plurality of concentric circular arcs (14') are carved on the second hemi-surface (122); the plurality of concentric circular arcs (14') divide the second hemi-surface (122) into the multiple annular surfaces (13'), and the annular surfaces (13') are arc-shaped.

7. An automobile, comprising automobile headlamp, wherein the automobile headlamp comprises a light source (16), a reflector (17), a shading (18), and a lens (1), the lens (1) comprises a first lens surface (11) and a second lens surface (12) opposite to the first lens surface (11), the first lens surface (11) is a curved surface or a planar surface, and the second lens surface (12) comprises a plurality of concentric circle-type annular surfaces (13); wherein all the annular surfaces (13) are distributed in a stepped manner, and a thickness of the lens (1) gradually increases from a center to an outer circumference, and the second surface (12) is concave inward; wherein the second lens surface (12) comprises a first hemi-surface (121) and a second hemi-surface (122); the first hemi-surface (121) is connected to the second hemi-surface (122) through a stepped surface (123); the first hemi-surface (121) is a curved surface; a plurality of concentric circular arcs (14') are carved on the second hemi-surface (122); the plurality of concentric circular arcs (14') divide the second hemi-surface (122) into the multiple annular surfaces (13'), and the annular surfaces (13') are arc-shaped.

\* \* \* \* \*